June 16, 1959 G. SOTEROPULOS 2,890,646
BALE CONTROL ATTACHMENT
Filed Oct. 18, 1955 2 Sheets-Sheet 1
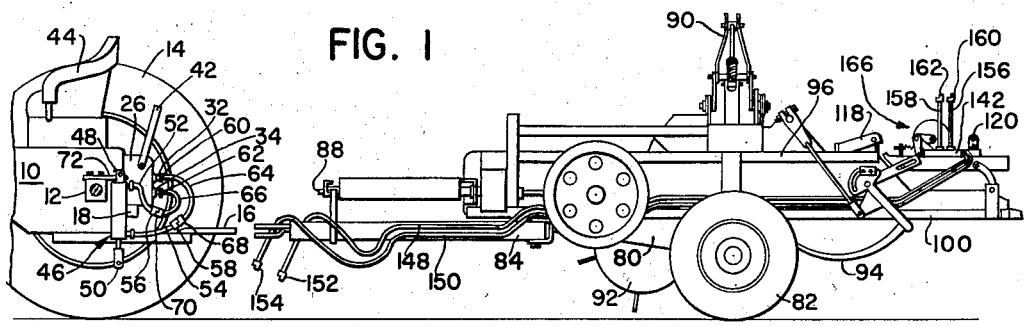
FIG. 1
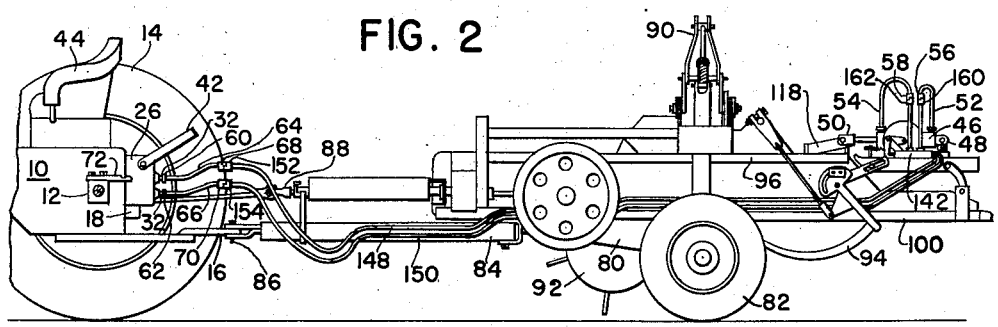
FIG. 2
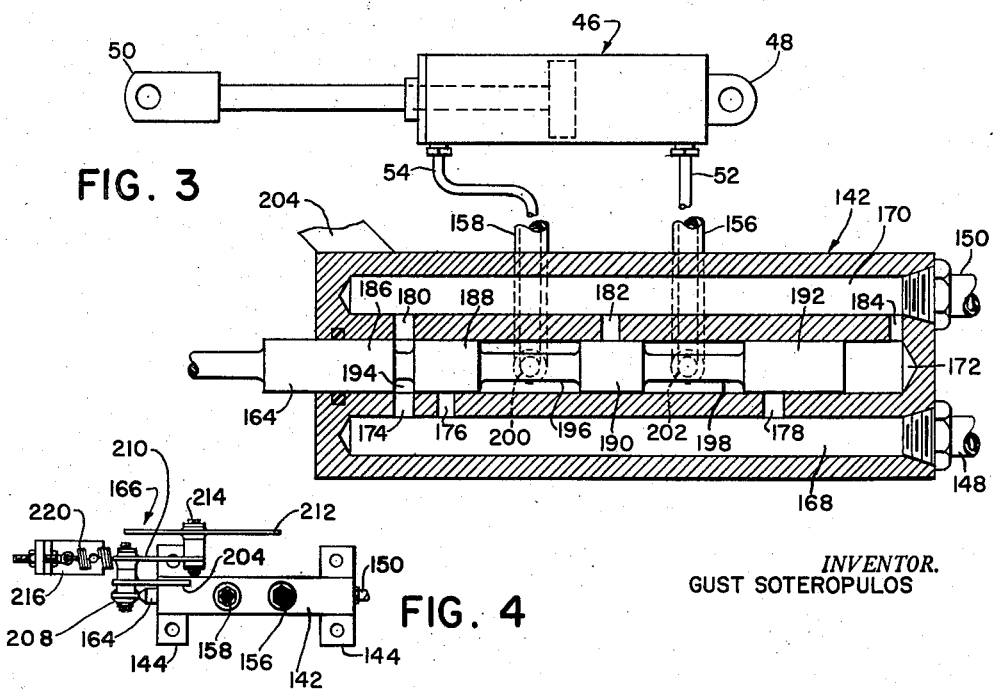
FIG. 3
FIG. 4
*INVENTOR.*
GUST SOTEROPULOS

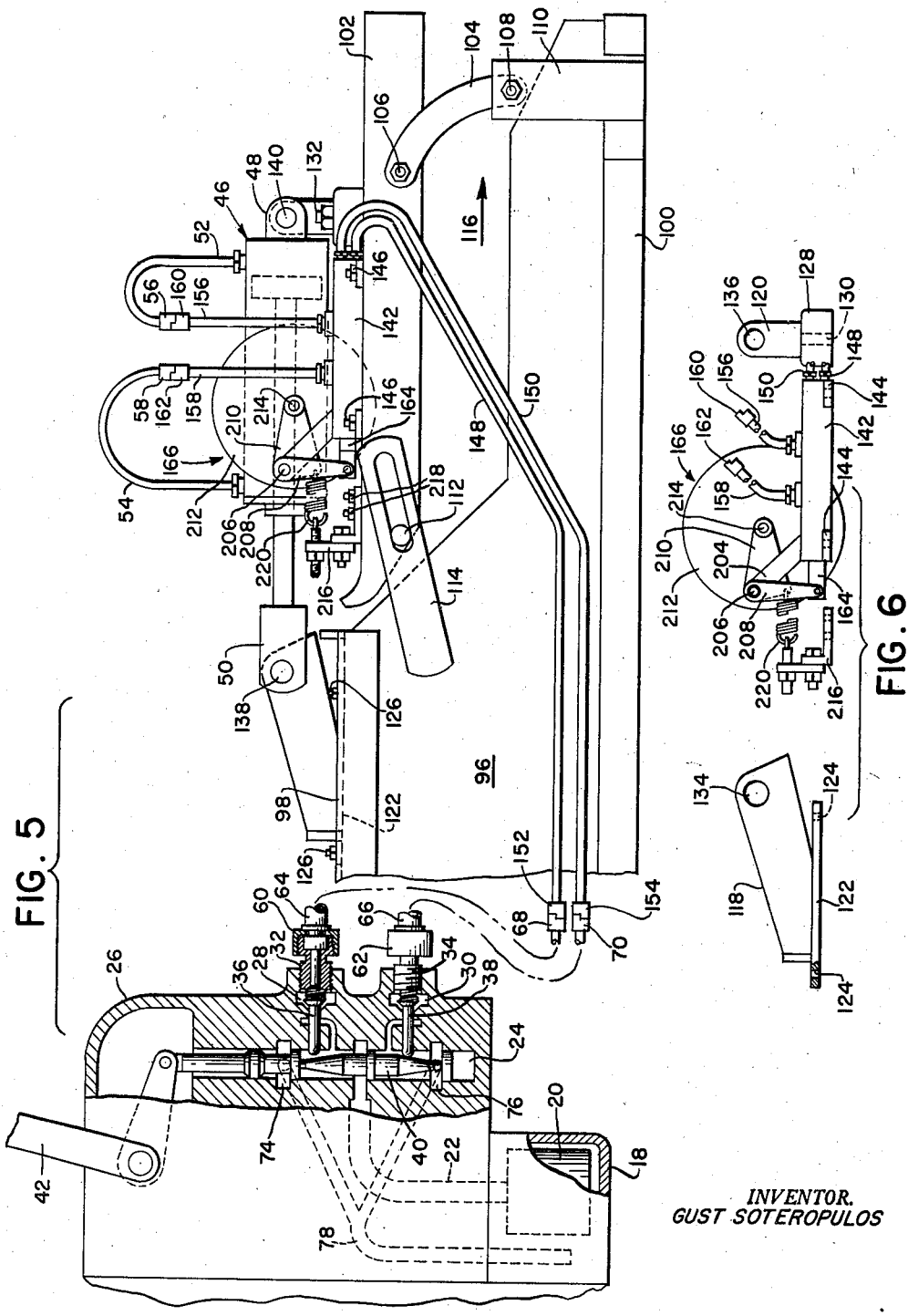

United States Patent Office 2,890,646
Patented June 16, 1959

2,890,646

BALE CONTROL ATTACHMENT

Gust Soteropulos, Ottumwa, Iowa, assignor, by mesne assignments, to Deere & Company, a corporation of Delaware Application October 18, 1955, Serial No. 541,197

8 Claims. (Cl. 100—43)

This invention relates to agricultural balers and more particularly to balers of the pick-up type drawn or otherwise propelled by a tractor. Still more particularly, the invention relates to means for controlling the resistance or back-pressure afforded by the bale discharge means in order to obtain bales of uniform weight, density, etc. characteristics.

A typical baler includes a bale case, one end of which affords an opening through which the material being baled is forced by bale-forming means such as a plunger. That portion of the bale case defining the discharge opening includes a movable member that is adjustable to vary the size of the opening, which is one way to vary the amount of resistance imposed to travel of the baleable material through the discharge opening, from which it follows that the smaller the opening, the greater the resistance and consequently the greater the back-pressure. In an ideal crop condition, in which all of the baleable material is of the same quality as respects its moisture content, etc., the movable member could be set at a preselected position and left there, and theoretically all bales would be of uniform weight. However, in pick-up baling, the crop varies from windrow to windrow and even in the same windrow. Consequently, a bale discharge opening setting for one type of crops will not satisfy the same crop where variations occur in moisture content, etc. That is to say, if the material being baled is relatively light and dry, it will pass more easily through the discharge opening and accordingly a bale of a given length will be lighter than a bale of the same length but made up of material having a higher moisture content. Conversely, with a given setting for the bale discharge opening, a bale of heavy, relatively moist and green material will weight more, per unit length, than a bale of relatively light and dry material. Accordingly, it has been recognized by those skilled in the art that some means must be provided for automatically regulating the size of the discharge opening in accordance with the changes in characteristics of the material that affect the back-pressure, and various types of such devices have heretofore been patented and some have been used commercially. They all operate on the principal that back-pressure in the bale case increases in direct proportion to the density of the material. In most cases, the expression "density" is used as an overall term to define all characteristics of the material that result in an increase in back-pressure. However, dense material has other characteristics. For example, the moisture content thereof may be higher, its coefficient of friction as respects the bale case will be higher, and it will be heavier than material that is light and dry. Nevertheless, the theory of operation of any automatic device is that the bale discharge opening must be decreased when the material is light, thereby increasing the back-pressure and enabling the compaction of more light material in a given length. Conversely, the size of the discharge opening must be increased in the presence of "dense" material so that a smaller amount of this material may be compacted in a given length, all in the interests of achieving uniformity in weight of the bales, regardless of the nature or "density" characteristics of the material.

Although devices of the character noted above have met with some success, there remains, both to the designer and to the purchaser, the prime consideration of cost, particularly in the field of hydraulically regulated control devices. In one well-known example, the baler must be equipped with a pump, a control valve and a hydraulic motor, together with means for driving the pump from some driving part on the baler. According to the present invention, a considerable portion of the cost of a hydraulically regulated control device is eliminated by the utilization of the hydraulic system of the tractor that is towing the baler, since most agricultural tractors of the present day have integrated hydraulic systems including a pump, a control valve housing and one or more fluid line connections. In most cases, the tractor is furnished, as original or optional equipment, with a two-way hydraulic cylinder connected to the valve housing connectors by fluid lines enabling the use of the motor in a position remote from the tractor, as for adjusting a wide variety of implements used with the tractor. It is the principal object of the present invention to provide a control device attachment for a baler in such manner as to utilize the hydraulic system of the tractor, in lieu of providing of an additional system of the baler itself. The invention features further the provision of a simple attachment that can be mounted on balers of existing types, utilizing the hydraulic system of the tractor and also utilizing the hydraulic cylinder normally furnished with the tractor for use with other implements. The invention has for additional objects the provision of a simple and economical control mechanism, a mechanism that may be readily mounted on or dismounted from a baler, and such other features as reside in the combination and arrangement of parts to be covered in detail in the ensuing specification and accompanying drawings, the several figures of which will be described immediately below.

Fig. 1 is a side view of the rear portion of a tractor and a baler in disconnected relationship, the near wheel of the tractor having been omitted to expose the exterior components of the hydraulic system.

Fig. 2 is a similar view in which the parts are shown in connected relationship.

Fig. 3 is a sectional view, on an enlarged scale, showing the auxiliary control valve housing and its relationship to the fluid motor, the motor being drawn at a reduced scale.

Fig. 4 is a plan view of the auxiliary valve housing and the related control device.

Fig. 5 is a fragmentary side view, partly in section, showing the main control valve housing and the pertinent part of the bale case with the control attachment mounted thereon.

Fig. 6 is an elevational view of the control attachment by itself, in the form furnished without the fluid motor.

In Figs. 1 and 2, the rear portion of a typical agricultural tractor will be recognized as having a main body 10 mounted on a transverse rear axle structure 12 which in turn carries right and left hand traction wheels, only the right hand one of which appears at 14, the left hand wheel having been omitted in the interests of clarity. A tractor of this type normally has a drawbar, such as that shown at 16 here, for the draft-connection of various types of implements. The most recent tractor models are equipped with what are generally called integrated hydraulic systems; that is to say, the hydraulic system is built in as part of the tractor or is designed in such manner that auxiliary housings can be attached to implement the basic equipment of the tractor. One such example is shown here, comprising detailed construction such as that shown in the U.S. patent to Jirsa et al. 2,532,552.

The rear portion of the tractor includes a housing part 18 which accommodates a pump 20 for furnishing fluid under pressure through a high pressure line 22 to a valve bore 24 formed in a main control valve housing 26. This housing includes upper and lower fluid ports 28 and 30, each of which exits in a connector, as at 32 for the port 28 and at 34 for the port 30. The ports are controlled respectively by upper and lower check valves 36 and 38 and a main control valve member 40 is axially shiftable in the bore 24 by means of an external control lever 42 located conveniently to an operator's seat 44 on the tractor. When the valve member 40 is displaced downwardly as shown in Fig. 5, the high pressure line 22 is connected to the fluid outlet 28 and the pressure in the line opens the check valve 36. The other check valve 38 is positively opened by the tapered lower end of the main control valve member 40. Consequently, the connector 32 is adapted to supply fluid under pressure, whereas the connector 34 accommodates return fluid, as from a two-way fluid motor 46 of the cylinder and piston type. As is conventional, this motor has a cylinder clevis 48 and a piston rod clevis 50, together with motor fluid lines 52 and 54. These lines respectively have fluid couplings 56 and 58, preferably of the self-sealing type. When the motor is used in connection with the tractor and other implements, it is normally connected to the valve housing connectors 32 and 34 by disconnectible couplings 60 and 62 at the respective ends of fluid lines 64 and 66, opposite ends of these lines having self-sealing couplings 68 and 70 that respectively mate with and are separably connectible to the motor line couplings 58 and 56. The control valve member 40 is selectively shiftable in opposite directions from a central neutral position to extend or retract the motor 46. When the motor 46 is not connected to any implement, it may be conveniently carried on the tractor by means of a support 72, mounted on the rear axle housing 12 and adapted to removably receive the cylinder clevis 48 (Fig. 1). The main control valve housing 26 has a pair of reservoir grooves 74 and 76 axially spaced apart along and concentric with the valve bore 24. These lead in common to a return or reservoir line 78.

The baler shown in the drawings is typical of a well-known commercial design, having a main frame 80 carried on wheels, only one of which is shown at 82, and connectible by a draft tongue 84 to the drawbar 16 at 86. Power for driving the baler is obtained from the power take-off shaft (not shown) of the tractor, via a propeller shaft assembly 88, which power is utilized to drive the baler plunger (not shown) and associated parts, such as an overhead feeder 90, pick-up mechanism 92 and tying mechanism including a needle 94. As is familiar to those versed in the art, the plunger reciprocates to compact material picked up in windrows from the field by the pick-up mechanism 92 and fed by the overhead feeder to a bale case 96. As best shown in Fig. 5, the bale case 96 is made up of a plurality of walls, those important here being a fixed top wall 98, a fixed floor 100 and a movable top wall or member 102, mobility of which is established by a link 104 pivoted at 106 to the movable member 102 and pivoted at 108 to a support 110 that is secured to the rear portion of the floor 100. The forward end of the extension is guided at 112 in a slotted member 114 fixed to one of the side walls of the bale case. It will be understood that there are a link 104 and a slotted member 114 at the other side of the bale case. The arrangement is such that the movable member 102 may shift upwardly and rearwardly and downwardly and forwardly. Stated otherwise, the direction of movement of the bales being formed is to the rear, or in the direction of the arrow 116, the space between the floor 100 and the movable member 102 defining a discharge opening through which the bales are moved and successively discharged as they are tied by the baler tying mechanism. Because of the movement of the member 102 relative to the fixed member 98 and fixed floor 100, the size of the discharge opening may be varied. That is to say, when the member 102 moves upwardly and rearwardly or generally in the direction of the arrow 116, the discharge opening is enlarged. Conversely, when the member moves forwardly and downwardly, the size of the discharge opening is reduced.

The principal feature of the present invention, as indicated generally above, resides in the provision of an improved control attachment for automatically controlling movement of the member 102 in response to back-pressure characteristics of the baleable material so that the member 102 is automatically moved downwardly and forwardly to decrease the size of the bale discharge opening when the material being baled is light and dry and the member 102 is automatically moved upwardly and rearwardly when the material being baled is moist, green, heavy, etc. In other words, the variations in position of the member 102 cause variations in the resistance to the passage of the baleable material and accordingly vary the back-pressure in the bale case. As already outlined, these general principles are well understood. The purpose of the present invention is to utilize them in a novel, simple and inexpensive attachment for effecting the necessary control.

One form of the attachment is shown by itself in elevation in Fig. 6. This is the form that the attachment will take when the motor 46 is utilized. The attachment may take another form in those cases in which the tractor is equipped with the hydraulic system but does not have the motor 46, in which case, the attachment will include the motor. However, normally the tractor has a motor such as the motor 46 and the combination shown in Fig. 6 will be all that is needed to convert a conventional baler to one having the improved automatic control. Normally, the conventional baler will utilize one or more springs connected either between the movable member 102 and the fixed member 98 or between the member 102 and the floor 100, which springs are set up to bias the member 102 downwardly and forwardly. According to the present invention, these springs are removed and are replaced by the automatic hydraulic control means.

The attachment comprises first and second brackets 118 and 120, each of which has means thereon for effecting the affixation thereof to the bale case members 98 and 102. For example, the bracket 118 has a base 122 apertured at 124 to receive bolts 126 (Fig. 5), which bolts are passed through the proximate portion of the member or top wall 98. Similarly, the bracket 120 has a base 128 apertured at 130 to receive bolts 132 (Fig. 5) for affixation to the movable member 102. The brackets are spaced apart on the order of a selected distance between the cylinder and piston rod clevises 48 and 50, and, accordingly, the brackets are respectively apertured at 134 and 136 to carry pins 138 and 140 for respectively receiving the clevises 50 and 48. In Fig. 5, the movable member or top wall 102 is shown substantially at its maximum forward position, and the motor 46 is substantially in its fully retracted position. Hence, it will follow that extension of the motor 46 will cause movement of the member 102 upwardly and rearwardly or in such direction as to enlarge the discharge opening.

A further part of the attachment comprises an auxiliary valve housing 142 provided with means for the affixation thereof to the bale case. In the preferred embodiment of the invention shown, the auxiliary valve housing is mounted directly on the top wall 102 and to that end, the housing has apertured ears 144 for receiving bolts 146 (Fig. 5). Running from the rear end of the valve housing 142 are upper and lower auxiliary fluid lines 148 and 150, which lines at their forward ends respectively have self-sealing couplings 152 and 154 mating with and separably connectible to the couplings 68 and 70 of the main valve housing fluid lines 64 and 66 (Fig. 5). Fig. 1 shows that the baler, while not connected to the tractor, has the couplings 152 and 154 in disconnected relationship to the main valve housing couplings 68 and 70, because the motor line couplings 56 and 58 are still connected to the main valve housing couplings. Fig. 2 shows the disconnection of the motor 46 from the main valve housing and the substitution therefor of the auxiliary valve housing lines 148 and 150, via the connections at 68—152 and 70—154. The motor in Fig. 2 is now installed between the mounting brackets 118 and 120 and the lines 54 and 52 are connected respectively to a second pair of auxiliary fluid lines 156 and 158 that lead from the auxiliary valve housing 142. The second auxiliary lines 156 and 158 respectively have couplings 160 and 162 that mate with and are separably connected to the motor line couplings 56 and 58.

With the connections just described effected in the manner shown in Fig. 2, the auxiliary valve housing 142 is now interposed in the circuit between the main control valve housing 26 and the motor 46. The main control valve member 40 is set in the position of Fig. 5 so that the upper port 28 becomes the high pressure outlet and the lower port 30 becomes the return. Automatic control of the circuit is accomplished by an auxiliary control valve member 164 and a control device, designated generally by the numeral 166, operative to engage bale material in the bale case for regulating the valve member 164 to extend or retract the motor and thus to adjust the movable member 102 in accordance with changes in the back-pressure characteristics of the material being baled.

The auxiliary control valve housing 142, best shown in section in Fig. 3, includes a passage 168 to which the fluid line 148 is connected and a passage 170 to which the fluid line 150 is connected. In other words, the passage 168 is connected to the high pressure outlet 28 of the main control valve housing 26 and the passage 178 is connected to the return port 30 of the main control valve housing. The valve housing 142 has a central bore 172 in which the valve member 164 is axially shiftable to accomplish registration and non-registration of certain lands, grooves and ports to be presently described. The passage 168 has a plurality of ports 174, 176 and 178 opening to the valve bore 172 and the passage 170 has a plurality of ports 180, 182 and 184 opening to the valve bore 172. The valve member 164 is of the spool type, having a plurality of lands or spools 186, 188, 190 and 192, respectively separated by grooves 194, 196 and 198. The valve bore 172 has a pair of ports 200 and 202 to which the lines 158 and 156 are respectively connected.

When the valve member 164 is in its neutral position as shown in Fig. 3, the ports 174 and 180 are in register across the valve groove 194. Hence, the flow of high pressure fluid from the line 148 into the passage 168 is returned to the reservoir via the passage 170 and line 150. The spools 188, 190 and 192 respectively block the ports 176, 182 and 178. The port 184 is always open to relieve the accumulation of fluid behind the valve member 164. When the valve member 164 is shifted to one side of its active position, as to the left from the neutral position of Fig. 3, the spool 188 interrupts the registration between the ports 174 and 180, and the groove 196 effects a fluid-connection between the port 176 and the fluid line port 200 to the line 158, thus supplying fluid under pressure to the left hand side of the piston in the motor 46 and effecting retraction of the motor. Fluid exhausted from the opposite end of the motor 46 via the line 52 is returned to the valve bore 172 through the line port 202, which is now connected to the port 182 by means of the groove 198 in the valve member 164. Consequently, the fluid is returned to the reservoir in the tractor hydraulic system.

When the valve member 164 is shifted to its other active position, to the right of the neutral position shown in Fig. 3, the land 186 on the valve member 164 interrupts the registration between the ports 174 and 180, and the valve groove 198 establishes communication between the high pressure port 178 and the line port 202, whereby fluid under pressure is supplied to the right hand end of the motor, thus extending the motor. Fluid returned from the opposite end of the motor, via the line 54, is returned to the reservoir via the line 158 and line port 200, which is now connected to the return port 182 via the groove 196 in the valve member.

The valve member 164 is automatically controlled by the control device 166. For this purpose, the control device is mounted on a bracket or support 204 which in this case is shown as being rigidly mounted on the forward part of the auxiliary valve housing 142. This support carries at one end thereof a rockshaft 206 which has fixed thereto a bell crank structure including a depending arm 208 and a rearwardly extending arm 210. A gauge wheel 212 is journaled on the rear end of the arm 210 by means of a short shaft 214 and serves as a feeler or responder. A third bracket 216 is affixable to the movable member or top wall 102 as by bolts 218 (Fig. 5) and serves as a connection for one end of a tension spring 220, the other end of which is connected to the bell crank 208—210 so as to bias the gauge wheel 212 in a downward direction.

*Operation*

With the top or movable member 102 in the position shown in Fig. 5, the valve member 164 is in its neutral position. The main control valve member 40 is set as shown in Fig. 5 and the fluid circulates idly through the auxiliary valve housing 142, because the passages 168 and 170 are interconnected via the ports 174 and 180 and the valve member groove 194. As bale material is compacted in the bale case 196, it moves rearwardly or in the direction of the arrow 116 and ultimately moves between the floor 100 and the movable member 102. The size of the discharge opening defined between the members 102 and 100 is smaller than the general size of the bale case, with the result that as the material leaves the bale case proper and enters between the floor 100 and the member 102, it expands and exerts a force that tends to cause the member 102 to shift upwardly and rearwardly, but shifting of the member is prevented by the hydraulic lock in the motor. The amount of this force will depend upon the back-pressure characteristics of the material. For example, if the material is moist, green, etc. the coefficient of friction between the material and the member 102 will be relatively high, back-pressure will likewise be relatively high. However, as already stated, the member 102 is temporarily immobilided by the hydraulic lock on the motor 46. Hence, movement of the member 102 must depend upon the actuation of the motor and this in turn is related to the responsiveness of the control device 166. If the material is moist, green, etc., it will tend to reject the wheel 212, whereupon the bell crank will rock in a counter-clockwise direction about the rockshaft 206 against the bias of the spring 220 and cause the valve member 164 to be shifted to the right of its Fig. 3 posiiton. When this occurs the high pressure passage 168 is connected to the right hand end of the motor 46 via the port 178, valve member groove 198, line port 202, and lines 156 and 52, causing extension of the motor 46 and consequently movement of the top member 102 rearwardly and upwardly, thus enlarging the size of the discharge opening and decreasing the resistance to passage of the material, thereby bringing the back-pressure to a mean value and permitting the bale to accumulate at a more rapid rate, with the result that it will attain a given weight. As the member 102 shifts upwardly and rearwardly, the position of the wheel 212 relative to the bale remains the same but the position of the wheel relative to the valve housing changes. That is to say, when the wheel was rejected by the material, it moved upwardly relative to the valve housing 142, which effected shifting of the valve member 164 to the right as already described. When the member 102 moves upwardly, it does so relative to the wheel, which is the same as movement of the wheel downwardly relative to the valve housing. This effects a follow-up action which restores the valve member 164 to neutral, in which it remains until the back-pressure characteristics of the material change again, which would occur, for example, if subsequent material had the characteristic of being light, fluffy, dry, etc. It necessarily follows that it takes more of this type of material to make up a bale of a given weight than it does moist, green, etc. material. Accordingly, the wheel 212 is no longer rejected by the light material, whereupon the wheel moves downwardly and causes shifting of the valve member 164 to the left as seen in Fig. 3, with the result that fluid under pressure is supplied to the left hand end of the motor 46, causing retraction of the motor and therefore shifting the member 102 downwardly and forwardly to decrease the size of the discharge opening. Thereupon, greater resistance to passage of the material is set up and the rate of accumulation of the material is slowed, effecting a tighter bale of lighter material, all to the end that such bale will have the same weight as a bale of heavier material, the uniformity being obtained by regulation of the size of the discharge opening between the floor 100 and movable member 102. Again, the follow-up action previously described is effected.

Summary

As will be seen, the novel attachment accomplishes all the desirable results of an automatic control and at the same time is simple and inexpensive, primarily because it utilizes the integrated hydraulic system of the tractor and therefore does not require its own pump. Since most tractors are equipped with remote hydraulic cylinders, that cylinder may be readily mounted on a typical baler by the utilization of the arrangement shown principally in Fig. 6, the characteristics of which are that the brackets 118 and 120 may be affixed to the bale case members 98 and 102 to support the remote cylinder therein for extension and retraction as controlled by the device 166. Other features and characteristics of the invention, not categorically enumerated herein, will undoubtedly occur to those versed in the art, as will many modifications and alterations in the preferred embodiment of the invention disclosed, all of which may be achieved without departing from the spirit and scope of the invention.

What is claimed is:

1. For use in an agricultural baler and tractor propelling the same, in which the tractor has a hydraulic system integrated therewith for multi-purpose usage and including a tractor-mounted pump and a main tractor-mounted control valve housing having a pair of fluid line couplings for supplying a multi-purpose fluid motor of the cylinder and piston type provided with a cylinder clevis, a piston clevis and a pair of motor fluid lines respectively having fluid line couplings normally mating with and separably connected to the main valve housing couplings, and in which the baler has a bale case remote from the tractor hydraulic system and is provided with a bale discharge opening and including a fixed member and a movable member movably connected to the fixed member so as to be relatively adjustable toward and away from the fixed member to vary the resistance to the passage of a bale through the discharge opening: a bale control attachment comprising a first bracket having means for the mounting thereof on one bale case member; a second bracket having means for the mounting thereof on the other bale case member in spaced relation to the first bracket on the order of a selected distance between the motor clevises; an auxiliary control valve housing having means for the mounting thereof on the bale case; a first pair of auxiliary fluid lines connected to the auxiliary valve housing and respectively having couplings mating with and separably connectible to the main valve housing couplings in lieu of the motor line couplings; disconnectible means respectively receiving the motor clevises on the first and second brackets to support the motor for extension and retraction to adjust the movable bale case member; a second pair of auxiliary fluid lines connected to the auxiliary valve housing and respectively having couplings mating with and separably connectible to the motor line couplings in lieu of the main valve housing couplings; a control valve in the auxiliary valve housing shiftable to active positions at either side of a neutral position for controlling the flow of fluid between the first and second auxiliary fluid lines; and a control device connected to the valve and having means for the movable mounting thereof on the bale case, said device being operative to engage bale material in the bale case for regulating the valve to extend or retract the motor and thus to adjust the movable member in accordance with changes in the back-pressure characteristics of the material.

2. The invention defined in claim 1, in which: the auxiliary valve housing and the control device are mountable on the movable member so that initially the control device moves relative to the movable member and auxiliary valve housing to move the valve to an active position and next the auxiliary valve housing moves with the movable member and relative to the control device to automatically return the valve to its neutral position.

3. The invention defined in claim 1, in which: the control device is mounted on the auxiliary valve housing.

4. For use in an agricultural baler and tractor propelling the same, in which the tractor has a hydraulic system integrated therewith for multi-purpose usage and including a tractor-mounted pump and a main tractor-mounted control valve housing having a pair of fluid line connectors, and in which the baler has a bale case remote from the tractor hydraulic system and is provided with a bale discharge opening and including a fixed member and a movable member movably connected to the fixed member so as to be relatively adjustable toward and away from the fixed member to vary the resistance to the passage of a bale through the discharge opening: a bale control attachment comprising a fluid motor of the cylinder and piston type provided with a cylinder clevis, a piston clevis and a pair of motor fluid lines respectively having fluid line connectors; mounting means for respectively connecting the motor clevises to the bale case members so that extension and retraction of the motor effects adjustment of the movable member; an auxiliary control valve housing having means for the mounting thereof on the bale case; a first pair of auxiliary fluid lines connected to the auxiliary valve housing and respectively having connectors separably connectible to the main valve housing connectors, said auxiliary valve housing having a second pair of auxiliary fluid lines provided with connectors connected respectively to the motor line connectors; a control valve in the auxiliary valve housing shiftable to active positions at either side of a neutral position for controlling the flow of fluid between the first and second auxiliary lines to connect opposite ends of the motor selectively to the main valve housing via the auxiliary valve housing; and a control device connected to the valve and having means for the movable mounting thereof on the bale case, said device being operative to engage bale material in the bale case for regulating the valve to extend or retract the motor and thus to adjust the movable member in accordance with changes in the back-pressure characteristics of the material.

5. The invention defined in claim 4, in which: the auxiliary valve housing and the control device are mountable on the movable member so that initially the control device moves relative to the movable member and auxiliary valve housing to move the valve to an active position and next the auxiliary valve housing moves with the movable member and relative to the control device to automatically return the valve to its neutral position.

6. The invention defined in claim 4, in which: the control device is mounted on the auxiliary valve housing.

7. For use in an agricultural baler and tractor propelling the same, in which the tractor has a hydraulic system integrated therewith for multi-purpose usage and including a tractor-mounted pump and a pair of main tractor-mounted fluid line connectors of which one is a fluid outlet and the other is a return, and in which the baler has a bale case remote from the tractor hydraulic system and is provided with a bale discharge opening and including a fixed member and a movable member movably connected to the fixed member so as to be relatively adjustable toward and away from the fixed member to vary the resistance to the passage of a bale through the discharge opening: a bale control attachment comprising a fluid motor of the cylinder and piston type provided with a cylinder clevis, a piston clevis and a pair of motor fluid lines respectively having fluid line connectors; means for respectively connecting the motor clevises to the bale case members so that extension and retraction of the motor effects adjustment of the movable member; a baler-mountable control valve remote from the tractor and housing having means for the mounting thereof on the bale case; a first pair of fluid lines connected to the valve housing and respectively having connectors separably connectible to the main fluid line connectors, said valve housing having a second pair of fluid lines provided with connectors connected respectively to the motor line connectors; a control valve in the valve housing shiftable to active positions at either side of a neutral position for controlling the flow of fluid between the first and second fluid lines to connect opposite ends of the motor selectively to the main fluid line connectors via the auxiliary valve housing; and a control device connected to the valve and having means for the movable mounting thereof on the bale case, said device being operative to engage bale material in the bale case for regulating the valve to extend or retract the motor and thus to adjust the movable member in accordance with changes in the back-pressure characteristics of the material.

8. The invention defined in claim 7, in which: the valve housing and the control device are mountable on the movable member so that initially the control device moves relative to the movable member and valve housing to move the valve to an active position and next the valve housing moves with the movable member and relative to the control device to automatically return the valve to its neutral position.

References Cited in the file of this patent

UNITED STATES PATENTS

| | | |
|---|---|---|
| 1,775,856 | Hauser | Sept. 16, 1930 |
| 2,576,784 | Dodds et al. | Nov. 27, 1951 |
| 2,619,367 | Hanson | Nov. 25, 1952 |

FOREIGN PATENTS

| | | |
|---|---|---|
| 490,666 | Canada | Feb. 17, 1953 |

UNITED STATES PATENT OFFICE

CERTIFICATE OF CORRECTION

Patent No. 2,890,646                                    June 16, 1959

Gust Soteropulos

It is hereby certified that error appears in the printed specification of the above numbered patent requiring correction and that the said Letters Patent should read as corrected below.

Column 8, line 8, for "separately" read -- separably --; column 9, line 32, after "valve" insert -- housing --; line 33, after "and" strike out "housing".

Signed and sealed this 20th day of October 1959.

(SEAL)

Attest:

KARL H. AXLINE
Attesting Officer

ROBERT C. WATSON
Commissioner of Patents